United States Patent
Ke et al.

(10) Patent No.: US 9,006,978 B2
(45) Date of Patent: Apr. 14, 2015

(54) DRIVING CIRCUIT WITH AN OVER-VOLTAGE PROTECTION DEVICE FOR MODULATING AN ELECTRICAL PARAMETER OF A DRIVEN DEVICE

(71) Applicant: Power Forest Technology, Zhubei (TW)

(72) Inventors: Po-Jen Ke, Zhongli (TW); Yang-Tai Tseng, Puli Township (TW)

(73) Assignee: Power Forest Technology, Zhubei (TW)

( * ) Notice: Subject to any disclaimer, the term of this patent is extended or adjusted under 35 U.S.C. 154(b) by 281 days.

(21) Appl. No.: 13/836,279

(22) Filed: Mar. 15, 2013

(65) Prior Publication Data

US 2014/0203708 A1 Jul. 24, 2014

(30) Foreign Application Priority Data

Jan. 18, 2013 (TW) .............................. 102102189 A

(51) Int. Cl.
| | |
|---|---|
| H05B 37/00 | (2006.01) |
| H05B 41/00 | (2006.01) |
| H05B 37/02 | (2006.01) |
| H02M 3/156 | (2006.01) |

(52) U.S. Cl.
CPC .............. *H05B 37/02* (2013.01); *H02M 3/156* (2013.01)

(58) Field of Classification Search
USPC ......................................... 315/119, 129, 360
See application file for complete search history.

(56) References Cited

U.S. PATENT DOCUMENTS

| | | | |
|---|---|---|---|
| 8,917,029 B2* | 12/2014 | Chu et al. ...................... 315/224 |
| 8,947,407 B2* | 2/2015 | Williams et al. .............. 345/204 |
| 2002/0130786 A1* | 9/2002 | Weindorf ................. 340/815.45 |
| 2009/0224736 A1* | 9/2009 | Santo et al. .................... 323/274 |
| 2010/0283397 A1* | 11/2010 | Chen et al. ..................... 315/192 |
| 2011/0006684 A1* | 1/2011 | Hodgson et al. ................ 315/77 |
| 2011/0156600 A1* | 6/2011 | Santo et al. ............... 315/185 R |
| 2013/0082615 A1* | 4/2013 | Williams et al. .............. 315/186 |
| 2013/0147375 A1* | 6/2013 | Williams et al. .............. 315/192 |
| 2014/0139498 A1* | 5/2014 | Hussain et al. ................ 345/204 |
| 2014/0139499 A1* | 5/2014 | Hussain et al. ................ 345/204 |
| 2014/0203708 A1* | 7/2014 | Ke et al. ......................... 315/119 |
| 2014/0247295 A1* | 9/2014 | Hussain et al. ................ 345/691 |
| 2014/0339991 A1* | 11/2014 | Zhang ........................... 315/186 |

* cited by examiner

*Primary Examiner* — Adam Houston
(74) *Attorney, Agent, or Firm* — Wang Law Firm, Inc.; Li K. Wang; Stephen Hsu

(57) ABSTRACT

A driving circuit with an over-voltage protection device for modulating an electrical parameter of a driven device includes at least a boost circuit, a signal processing circuit, an over-voltage protection device, a modulation device and a control circuit. The output terminal of the boost circuit is electrically coupled in series to a driven device, a transistor and a grounded feedback resistor sequentially, wherein the output terminal of the boost circuit is further electrically coupled to a voltage dividing circuit for outputting a voltage dividing signal. The signal processing circuit is provided for outputting a processing signal to the over-voltage protection device and the modulation device according to the voltage dividing signal and a modulation signal. The control circuit is provided for turning on the transistor or not according to an output signal of the over-voltage protection device and an output signal of the modulation device.

10 Claims, 4 Drawing Sheets

DRIVING CIRCUIT WITH AN OVER-VOLTAGE PROTECTION DEVICE FOR MODULATING AN ELECTRICAL PARAMETER OF A DRIVEN DEVICE

CROSS-REFERENCE TO RELATED APPLICATIONS

This application claims priority under 35 USC §119 to Taiwan Patent Application No. 102102189, filed on Jan. 18, 2013 in the Taiwan Intellectual Property Office (TIPO), the contents of which are herein incorporated by reference in their entirety.

FIELD OF THE INVENTION

The present invention relates to a driving circuit with an over-voltage protection device for modulating an electrical parameter of a driven device, in particular to a driving circuit with an over-voltage protection device for modulating an electrical parameter of a driven device is enabled to reduce the number of pins.

BACKGROUND OF THE INVENTION

Due to the rapid development of liquid-crystal display (LCD), the light-emitting diode (LED) backlighting is gradually becoming more common instead of the cold-cathode fluorescent lamps (CCFL) backlighting.

With reference to FIG. 1 for a boost LED backlight driver having a dimming and over-voltage protection device, comprises: a boost circuit 10, a driven device 20 (e.g. LED), a transistor Q1, a feedback resistor $R_{FB}$, voltage dividing circuit 30, a modulation comparator 70, an over-voltage comparator 80 and a modulation signal source 50.

When a transistor Q3 is turned on, an input voltage Vin is applied across a inductor L1 so as to linearly increase the current of the inductor L1 to store energy therein. If the transistor Q3 achieves a desired on time, the transistor Q3 is turned off immediately such that the stored energy is outputted to an output terminal of the boost circuit 10 via a diode D1 and charges a capacitor C3. The input voltage Vin will increase to a predetermined level of the output terminal of the boost circuit 10 by repeating the aforementioned operations. These operations are referred to as the principle of boost.

Wherein, the output terminal of the boost circuit 10 is electrically coupled in series to the LED, the transistor Q1 and the feedback resistor $R_{FB}$ sequentially. A feedback voltage of the feedback resistor $R_{FB}$ is outputted to a FB pin and compared with an error amplifier (not shown) to generate a suitable duty cycle for outputting to the transistor Q3, and a predetermined current is achieved.

Wherein, an over-voltage protection method is the output voltage of the boost circuit 10 for outputting to an OVP pin via voltage dividing circuit 30 and comparing with a reference voltage 2.5V of the over-voltage comparator. If the output voltage exceeds 2.5V, the driving circuit is turned off and latched.

Besides, a dimming method is the modulation signal of the modulation signal source 50 for outputting to a DIM pin and comparing with a reference voltage of the modulation comparator 70, wherein the modulation signal is a pulse width modulation (PWM) signal. If the voltage of the modulation signal falls below 0.2V, the modulation comparator 70 outputs a signal to DIMOUT pin such that the transistor Q1 is turned off for cutting off the current of the LED. If the voltage of the modulation signal exceeds 0.3V, the modulation comparator 70 outputs a signal to DIMOUT pin such that the transistor Q1 is turned on for generating the current of the LED. Therefore, the driving circuit is enabled to modulate the current of the LED according to the duty cycle of the modulation signal.

SUMMARY OF THE INVENTION

However, conventional boost LED backlight driver having a dimming and over-voltage protection device can not achieve the aforementioned functions in the situation of the limitation in the number of pins.

In view of the drawbacks of the prior art, the inventor of the present invention designed a driving circuit with an over-voltage protection device for modulating an electrical parameter of a driven device to overcome the issue of maintaining the functions of modulating an electrical parameter of a driven device and over-voltage protection in the situation of cost control and the limitation in the number of pins.

To achieve the foregoing objective, the present invention provides a driving circuit with an over-voltage protection device for modulating an electrical parameter of a driven device comprises at least a boost circuit, a signal processing circuit, an over-voltage protection device, a modulation device and a control circuit. The output terminal of the boost circuit is electrically coupled in series to a driven device, a first transistor and a grounded feedback resistor sequentially, wherein the output terminal of the boost circuit is further electrically coupled to a voltage dividing circuit for outputting a voltage dividing signal.

In addition, the signal processing circuit provided for outputting a processing signal to the over-voltage protection device and a modulation device according to the voltage dividing signal and a modulation signal of a modulation signal source, wherein the over-voltage protection device and the modulation device are an over-voltage comparator and a modulation comparator respectively. The modulation signal and the processing signal are a pulse width modulation (PWM) signal respectively.

Besides, a phase of the processing signal is opposite to that of the modulation signal, and an amplitude of the processing signal corresponds to that of the voltage dividing signal. The aforementioned output terminal of the signal processing circuit is electrically coupled to a non-inverting input terminal of the over-voltage protection device and a non-inverting input terminal of the modulation device such that the input pin of the modulation device and the input pin of the over-voltage protection device are enabled to combine to form a common pin.

In addition, the control circuit provided for turning on the transistor or not according to an output signal of the over-voltage protection device and an output signal of the modulation device, wherein if the processing signal exceeds a reference level of the over-voltage protection device, the transistor is turned off; if the processing signal does not exceed the reference level, the electrical parameter of the driven device is modulated according to the output signal of the modulation device. Therefore, the present invention is enabled to overcome the issue of maintaining the functions of modulating an electrical parameter of a driven device and over-voltage protection in the situation of cost control and the limitation in the number of pins.

The aforementioned signal processing circuit comprises a second transistor, a resistor and a grounded capacitor, wherein the resistor is electrically coupled between a gate electrode of the second transistor and the modulation signal source. The capacitor is electrically coupled to the gate electrode of the second transistor. One of source/drain electrodes or one of emitter/collector electrodes of the second transistor is grounded, and the output terminal of the signal processing circuit is electrically coupled to the other of source/drain electrodes or the other of emitter/collector electrodes of the second transistor and the voltage dividing circuit.

Besides, the signal processing circuit may also comprises a diode and a third transistor, wherein a cathode of the diode is electrically coupled to one of source/drain electrodes or one of emitter/collector electrodes of the third transistor. The other of source/drain electrodes or the other of the emitter/collector electrodes of the third transistor is grounded. A gate electrode of the third transistor is electrically coupled to the modulation signal source, and the output terminal of the signal processing circuit is electrically coupled to an anode of the diode and the voltage dividing circuit.

The aforementioned control circuit comprises a latch and a NOR logic gate, wherein the latch outputs a latch signal to the NOR logic gate according to the output signal of the over-voltage protection device, and the NOR logic gate turns on the transistor or not according to the latch signal and the output signal of the modulation device.

The aforementioned driven device is a light-emitting diode (LED) or a cold-cathode fluorescent lamp (CCFL). The aforementioned electrical parameter is current or voltage.

In summation, the driving circuit with an over-voltage protection device for modulating an electrical parameter of a driven device has the following advantages:

1. The driving circuit of the present invention is enabled to combine the pins of modulation device and the over-voltage protection device to form a common pin.

2. The driving circuit of the present invention is enabled to overcome the issue of maintaining the functions of modulating an electrical parameter of a driven device and over-voltage protection in the situation of cost control and the limitation in the number of pins.

The advantages and spirit of the present invention will become apparent with the detailed description of preferred embodiments and the illustration of related drawings as follows.

DESCRIPTION OF THE PREFERRED EMBODIMENTS

The technical characteristics, contents, advantages and effects of the present invention will be apparent with the detailed description of a preferred embodiment accompanied with related drawings as follows. It is noteworthy that the drawings are not necessarily drawn according to the exact proportion or the actual installation since they are provided for the purpose of illustrating the present invention, but not intended for limiting the scope of the invention. It is noteworthy that same numerals are used to represent respective elements in the following preferred embodiments.

Figure 1:
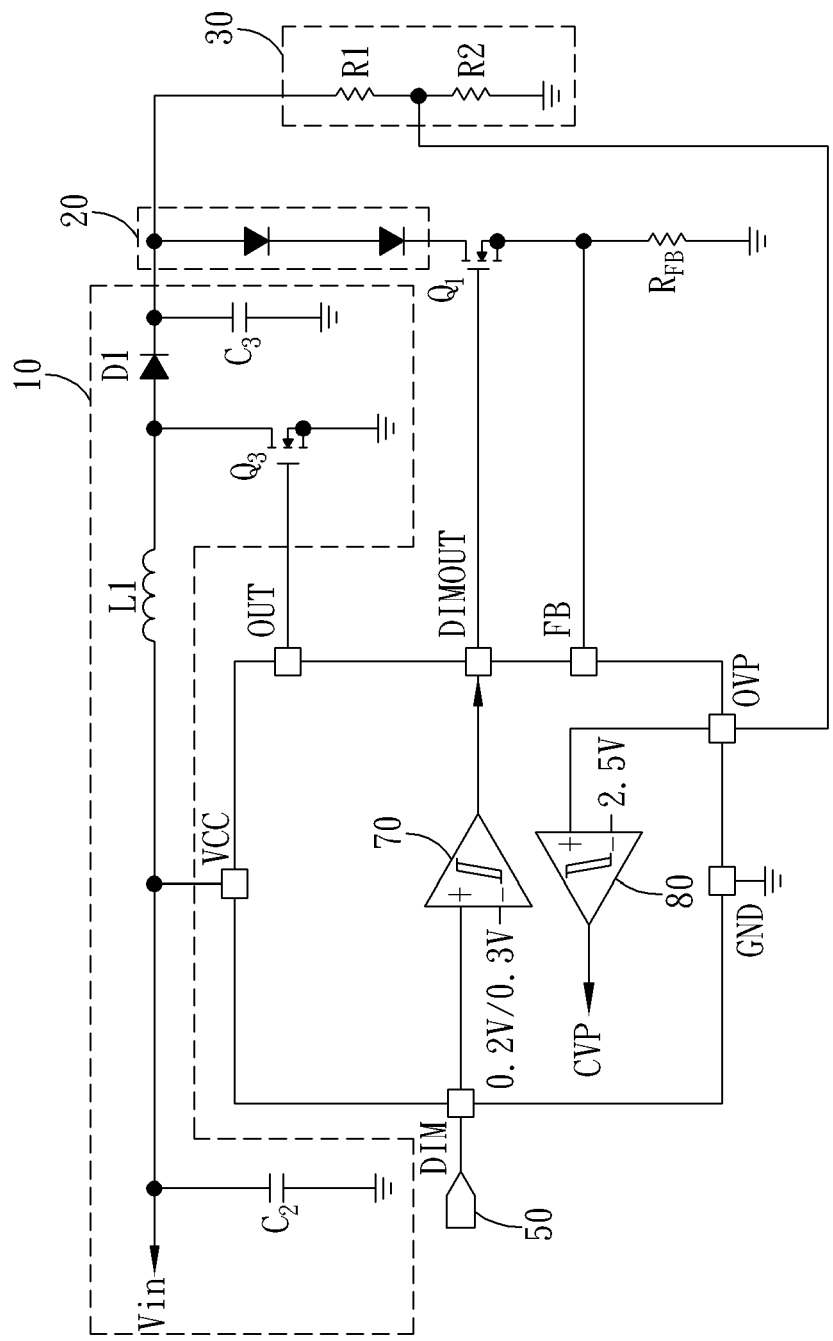
FIG. 1 shows a conventional boost LED backlight driver having a dimming and over-voltage protection device.
Figure 2:
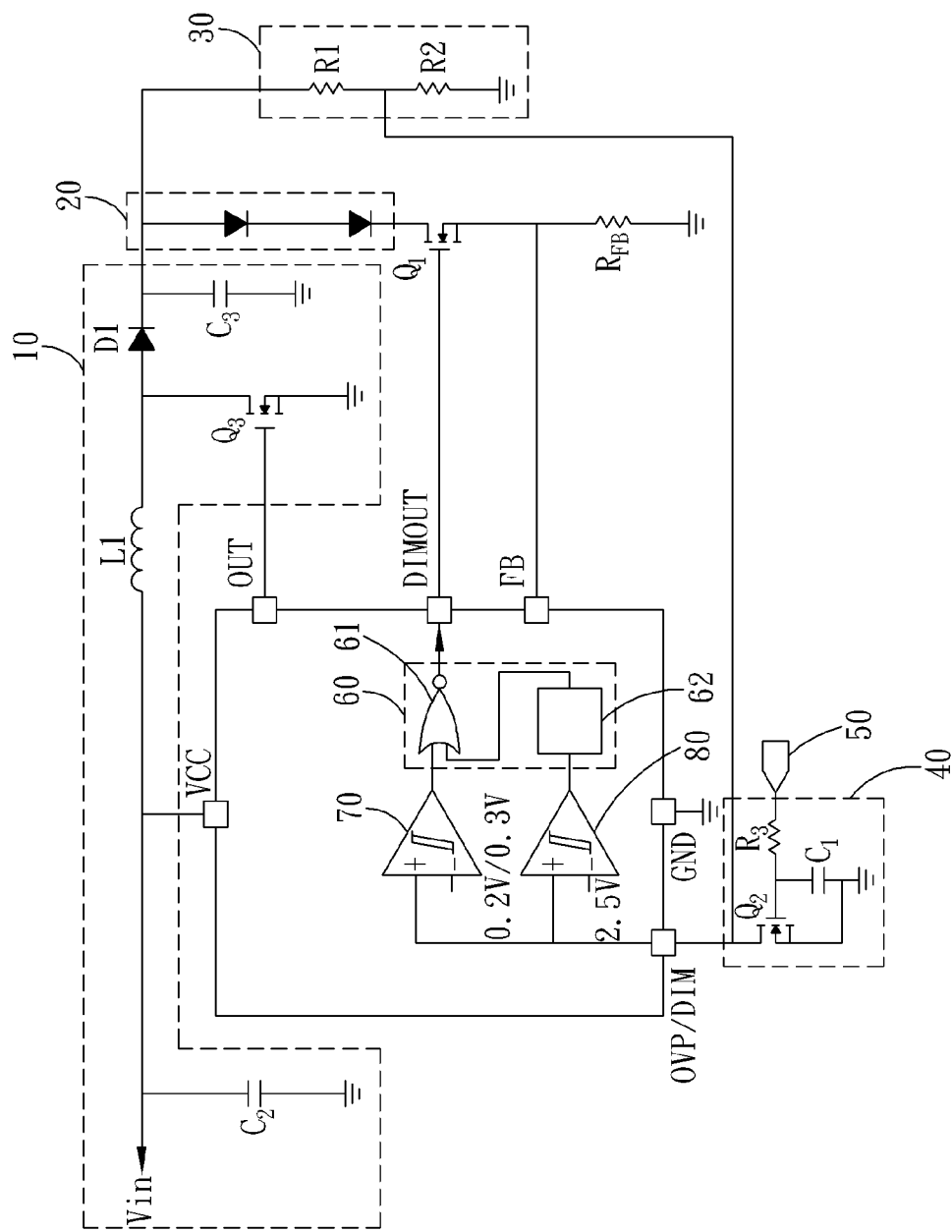
FIG. 2 shows a first embodiment of the driving circuit with an over-voltage protection device for modulating an electrical parameter of a driven device in accordance with the present invention.
Figure 3:
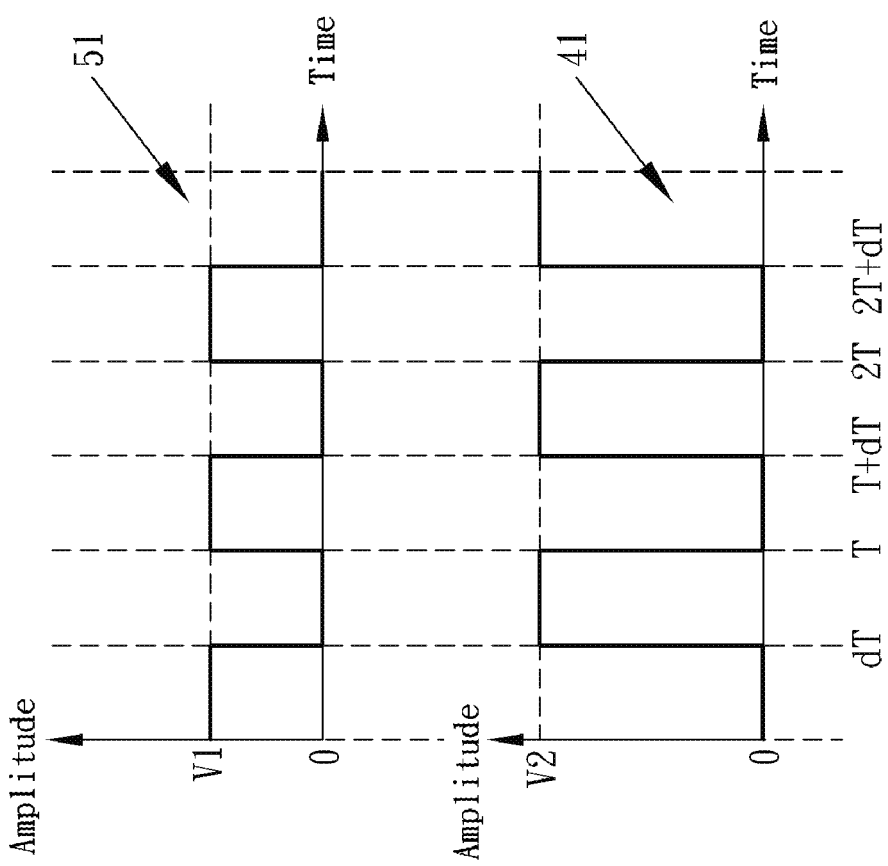
FIG. 3 shows a first embodiment of the modulation signal and the processing signal of the driving circuit with an over-voltage protection device for modulating an electrical parameter of a driven device in accordance with the present invention.

With reference to FIGS. 2 and 3, FIG. 2 shows a first embodiment of the driving circuit with an over-voltage protection device for modulating an electrical parameter of a driven device in accordance with the present invention. FIG. 3 shows a first embodiment of the modulation signal and the processing signal of the driving circuit with an over-voltage protection device for modulating an electrical parameter of a driven device in accordance with the present invention.

The driving circuit with an over-voltage protection device for modulating an electrical parameter of a driven device comprises at least a boost circuit 10, a signal processing circuit 40, an over-voltage protection device, a modulation device and a control circuit 60, wherein the over-voltage protection device and the modulation device may be an over-voltage comparator 80 and a modulation comparator 70 respectively.

In addition, the output terminal of the boost circuit 10 may be electrically coupled in series to a driven device 20, a transistor Q1 and a grounded feedback resistor $R_{FB}$ sequentially, wherein the output terminal of the boost circuit 10 is further electrically coupled to a voltage dividing circuit 30 for outputting a voltage dividing signal. The driven device 20 may be a light-emitting diode (LED) or a cold-cathode fluorescent lamps (CCFL), and the voltage dividing circuit 30 may comprise resistors R1 and R2 coupled in series. Besides, the transistors of the present invention may be Metal-Oxide-Semiconductor Field-Effect Transistor (MOSFET) or Bipolar Junction Transistor (BJT) or merely a feedback resistor. The preferred embodiment of the present invention is MOSFET. Therefore, the following description will describe with MOSFET of a preferred embodiment.

Furthermore, the signal processing circuit 40 is provided for outputting a processing signal 41 to OVP/DIM pin according to the voltage dividing signal of the voltage dividing circuit 30 and a modulation signal 51 of a modulation signal source 50. The OVP/DIM pin is electrically coupled to a non-inverting input terminal of the over-voltage comparator 80 and a non-inverting input terminal of the modulation comparator 70. Therefore, the input pin DIM of the modulation comparator 70 and the input pin OVP of the over-voltage comparator 80 are enabled to combine to form a common pin. Wherein, the modulation signal 51 and the processing signal 41 are a pulse width modulation (PWM) signal respectively.

Besides, the signal processing circuit 40 may comprises a transistor Q2, a resistor R3 and a grounded capacitor C1. The resistor R3 is electrically coupled between the gate electrode of the transistor Q2 and the modulation signal source 50. The capacitor C1 is electrically coupled to the gate electrode of the transistor Q2, wherein the source electrode of the transistor Q2 may be grounded, and the output terminal of the signal processing circuit 40 may be electrically coupled to the drain electrode of the transistor Q2 and the voltage dividing circuit 30.

In FIG. 3, when the modulation signal 51 is in the time interval between 0 and dT, the amplitude of the modulation signal 51 is V1; meanwhile, the transistor Q2 is turned on. Therefore, the output terminal of the signal processing circuit 40 is regarded as being grounded such that the amplitude of the processing signal 41 of the signal processing circuit 40 is 0 in the time interval between 0 and dT.

When the modulation signal 51 is in the follow up time interval between dT and T, the amplitude of the modulation signal 51 is 0; meanwhile, the transistor Q2 is turned off, and the amplitude V2 of the processing signal 41 corresponds to that of the voltage dividing signal of the voltage dividing circuit 30 in the time interval between dT and T. Therefore, the phase of the modulation signal 51 is opposite to that of the processing signal 41.

In addition, the control circuit 60 is provided for turning on the transistor Q1 or not according to the output signal of the over-voltage comparator 80 and the output signal of the modulation comparator 70. The control circuit 60 may comprises a latch 62 and a NOR logic gate 61, wherein the latch 62 outputs a latch signal to the NOR logic gate 61 according to the output signal of the over-voltage comparator 80, and the NOR logic gate 61 turns on the transistor Q1 or not according to the latch signal and the output signal of the modulation comparator 70.

Wherein, if the amplitude V2 of the processing signal 41 exceeds a reference level such as 2.5V of the over-voltage comparator 80, the transistor Q1 is turned off and latched so as to prevent the transistor Q1 being turned on in the next time interval such as between T and T+dT).

On the contrary, if the amplitude V2 of the processing signal 41 does not exceed a reference level such as 2.5V of the over-voltage comparator 80, the output signal of the control circuit 60 corresponds to that of the modulation comparator 70. Meanwhile, when the amplitude of the processing signal 41 does not exceed a reference level such as 0.2V (e.g. the amplitude is 0 in the time interval between 0 and dT) of the modulation comparator 70, the control circuit 60 outputs a signal to the DIMOUT pin such that the transistor Q1 is turned off so as to cutoff the current of the driven device 20. When the amplitude V2 of the processing signal 41 exceeds a reference level such as 0.3V (e.g. between dT and T) of the modulation comparator 70, the control circuit 60 outputs a signal to the DIMOUT pin such that the transistor Q1 is turned on so as to open the current of the driven device 20.

Therefore, with the reference to LEDs, the transistor Q1 is enabled to modulate the electrical parameter of a driven device 20 such as voltage or current according to the duty cycle of the output signal of the modulation comparator 70 such that the driving circuit is enabled to maintain the functions of modulating an electrical parameter of a driven device and over-voltage protection in the situation of cost control and the limitation in the number of pins. However, the present disclosure is not limited thereto. In other words, if the control circuit 60 corresponds to the aforementioned functions of logic determination, it all belongs to the scope of the present invention.

Figure 4:
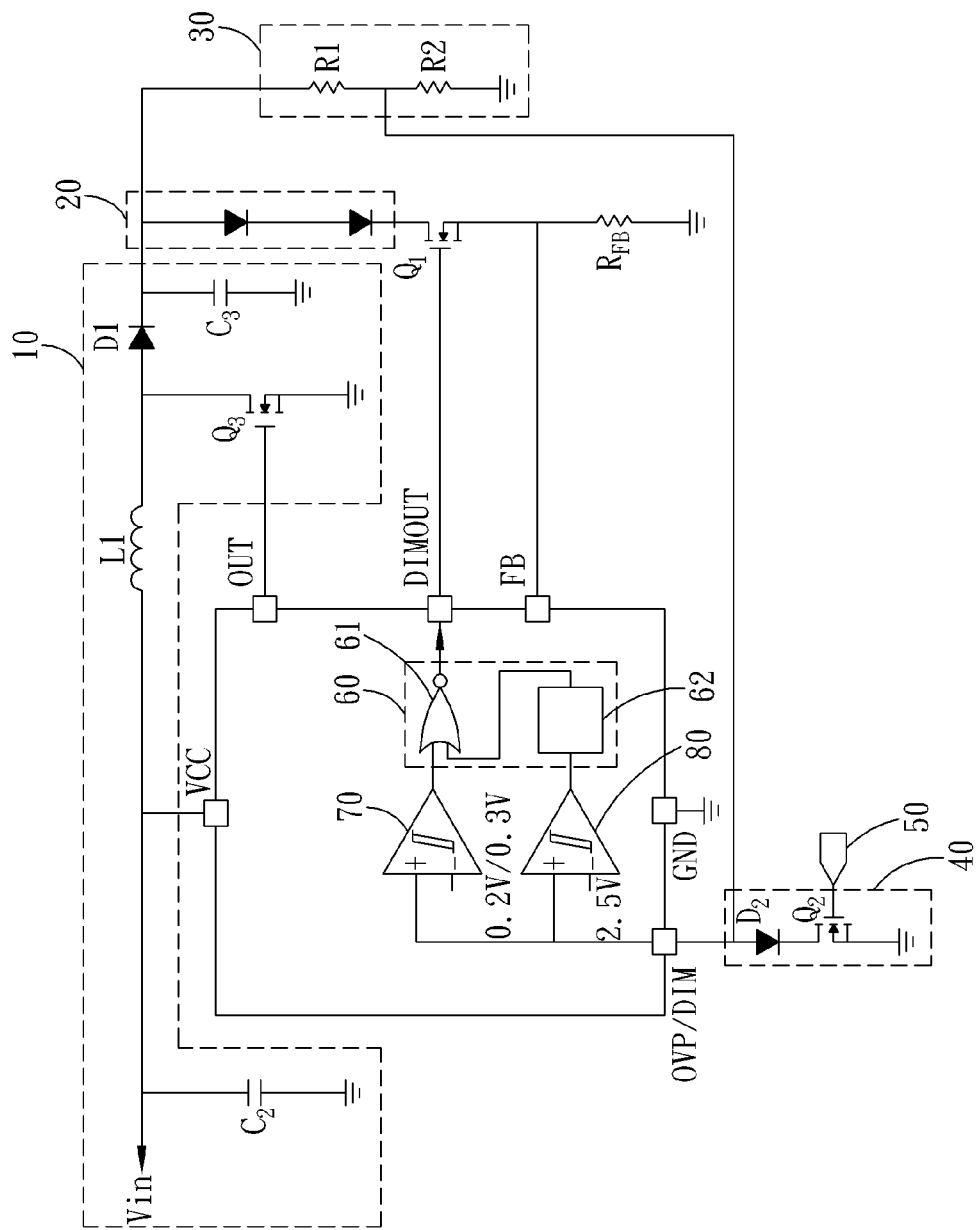
FIG. 4 shows a second embodiment of the driving circuit with an over-voltage protection device for modulating an electrical parameter of a driven device in accordance with the present invention.

With reference to FIGS. 3 and 4, FIG. 4 shows a second embodiment of the driving circuit with an over-voltage protection device for modulating an electrical parameter of a driven device in accordance with the present invention. The signal processing circuit 40 may also comprises a diode D2 and a transistor Q2, wherein a cathode of the diode D2 may be electrically coupled to the drain electrode of the transistor Q2. The source electrode of the transistor Q2 may be grounded. A gate electrode of the transistor Q2 is electrically coupled to the modulation signal source 50, and the output terminal of the signal processing circuit 40 is electrically coupled to an anode of the diode D2 and the voltage dividing circuit 30.

In FIG. 3, when the modulation signal 51 is in the time interval between 0 and dT, the amplitude of the modulation signal 51 is V1; meanwhile, the transistor Q2 is turned on. Therefore, the output terminal of the signal processing circuit 40 is regarded as being grounded such that the amplitude of the processing signal 41 of the signal processing circuit 40 is 0 in the time interval between 0 and dT.

When the modulation signal 51 is in the follow up time interval between dT and T, the amplitude of the modulation signal 51 is 0; meanwhile, the transistor Q2 is turned off, and the amplitude V2 of the processing signal 41 corresponds to that of the voltage dividing signal of the voltage dividing circuit 30 in the time interval between dT and T. However, the present disclosure is not limited thereto. In other words, if the signal processing circuit 40 corresponds to the aforementioned functions of processing signal, it all belongs to the scope of the present invention.

In summary, the driving circuit of the present invention is enabled to combine the OVP pin and the DIM pin to form an OVP/DIM pin so as to maintain the functions of modulating an electrical parameter of a driven device and over-voltage protection in the situation of cost control and the limitation in the number of pins.

While the invention has been described by means of specific embodiments, numerous modifications and variations could be made thereto by those skilled in the art without departing from the scope and spirit of the invention set forth in the claims.

What is claimed is:

1. A driving circuit with an over-voltage protection device for modulating an electrical parameter of a driven device, comprising:
   a boost circuit having an output terminal electrically coupled in series to the driven device, a transistor and a grounded feedback resistor sequentially, wherein the output terminal of the boost circuit is further electrically coupled to a grounded voltage dividing circuit for outputting a voltage dividing signal;
   a signal processing circuit provided for outputting a processing signal to the over-voltage protection device and a modulation device according to the voltage dividing signal and a modulation signal of a modulation signal source, wherein a phase of the processing signal is opposite to that of the modulation signal, and an amplitude of the processing signal corresponds to that of the voltage dividing signal; and
   a control circuit provided for turning on the transistor or not according to an output signal of the over-voltage protection device and an output signal of the modulation device; wherein if the processing signal exceeds a reference level of the over-voltage protection device, the transistor is turned off; if the processing signal does not exceed the reference level, the electrical parameter of the driven device is modulated according to the output signal of the modulation device.

2. The driving circuit according to claim 1, wherein the over-voltage protection device and the modulation device are an over-voltage comparator and a modulation comparator respectively.

3. The driving circuit according to claim 2, wherein an output terminal of the signal processing circuit is electrically coupled to a non-inverting input terminal of the over-voltage protection device and a non-inverting input terminal of the modulation device.

4. The driving circuit according to claim 3, wherein the signal processing circuit comprises a transistor, a resistor and a grounded capacitor; the resistor is electrically coupled between a gate electrode of the transistor of the signal processing circuit and the modulation signal source; the capacitor is electrically coupled to the gate electrode of the transistor of the signal processing circuit, wherein one of source/drain electrodes or one of emitter/collector electrodes of the transistor of the signal processing circuit is grounded, and the output terminal of the signal processing circuit is electrically coupled to the other of source/drain electrodes or the other of emitter/collector electrodes of the transistor of the signal processing circuit and the voltage dividing circuit.

5. The driving circuit according to claim 3, wherein the signal processing circuit comprises a diode and a transistor; a cathode of the diode is electrically coupled to one of source/drain electrodes or one of emitter/collector electrodes of the transistor of the signal processing circuit, wherein the other of source/drain electrodes or the other of emitter/collector electrodes of the transistor of the signal processing circuit is grounded; a gate electrode of the transistor of the signal processing circuit is electrically coupled to the modulation signal source, and the output terminal of the signal processing circuit is electrically coupled to an anode of the diode and the voltage dividing circuit.

6. The driving circuit according to claim 1, wherein the control circuit comprises a NOR logic gate and a latch outputting a latch signal to the NOR logic gate according to the output signal of the over-voltage protection device, and the NOR logic gate turns on the transistor or not according to the latch signal and the output signal of the modulation device.

7. The driving circuit according to claim 1, wherein the modulation signal and the processing signal are a pulse width modulation (PWM) signal respectively.

8. The driving circuit according to claim 1, wherein the driven device is a light-emitting diode (LED) or a cold-cathode fluorescent lamps (CCFL).

9. The driving circuit according to claim 1, wherein the reference level is a reference voltage of the over-voltage protection device.

10. The driving circuit according to claim 1, wherein the electrical parameter is current or voltage.

* * * * *